April 2, 1935.　　　B. MATEUSZCZYK　　　1,996,584
MIRROR LAMP SHADE
Filed May 7, 1934

INVENTOR
BOLESLAW MATEUSZCZYK
BY
ATTORNEY

Patented Apr. 2, 1935

1,996,584

UNITED STATES PATENT OFFICE 1,996,584

MIRROR LAMP SHADE

Boleslaw Mateuszczyk, New York, N. Y.

Application May 7, 1934, Serial No. 724,368

7 Claims. (Cl. 240—103)

This invention relates to new and useful improvements in a mirror lamp shade.

The invention has for an object the construction of an article as mentioned which is characterized by a diverging lamp shade with the small end at the top and having flat sides connected with each other, and the top portions of said flat sides engaging over and against flat sides of a support bracket, whereby the shade is supported at the top and sides of the shade and may be finished with mirroring and the like.

Still further the invention proposes an arrangement whereby the mirroring may be disposed either on the outside or inside depending upon taste.

Still further it is another object of this invention to provide several openings through the sides of said shade so that the light from a lamp within the shade may pass to the exterior.

Another one of the objects of this invention is the arrangement of a novel support bracket for supporting the shade and adapted to support a lamp socket.

Another one of the objects of this invention is the provision of an arrangement whereby the inner and outer sides of the shade may be formed with different types of mirrors, and an arrangement whereby either of the sides may be placed outside.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims, in which the various novel features of the invention are more particularly set forth.

In the accompanying drawing forming a material part of this disclosure:

The mirror lamp shade according to this invention comprises a support bracket 10 having a threaded cylindrical shell top portion 10' for supporting a lamp socket 11, said top portion being connected with a horizontal intermediate exterior shoulder 10$^a$ continuing into a plurality of diverging flat sides 10$^b$ of substantially hollow frusto-pyramid form. The socket 11 may be of any conventional design having an exterior cylindrical shaped end and is secured within the top portion 10' of the support bracket either frictionally, by soldering, or any similar arrangement. The dot and dash lines 12 indicate a conventional lamp within the lamp socket 11 so that the operation of the lamp shade may be better understood.

In conjunction with the support bracket 10 there is a diverging lamp shade 13 having the small end 13' arranged at the top and having a plurality of flat sides connected with each other at adjacent edges, and at the top portions thereof fitting over and against the flat sides 10$^b$.

Figure 4:
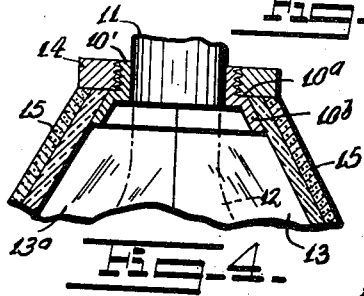
Fig. 4 is a fragmentary enlarged sectional view taken on the line 4—4 of Fig. 3.

A nut 14 is threadedly engaged upon the top portion 10' of the support bracket and engages against the shoulder 10$^a$ and extends over the top edges of the sides of the shade 13. It is pointed out that the construction is such that the nut 14 holds the shade in position upon the support bracket. When the nut 14' is threadedly disengaged from the support bracket then the shade 13 may be lifted relative to the support bracket and in this manner disengaged from it. The flat sides of the shade 13 correspond numerically with the flat sides 10$^b$ of the support bracket and these parts are so proportioned that in the engaged position, illustrated for example in Fig. 4, the flat sides of the shade are in intimate contact with the flat sides 10$^b$.

The shade 13 is constructed of glass or similar material and is provided with mirroring 15 on the outer side. This arrangement renders the inner side 13$^a$ of the shade 13 with the ability to reflect and constitutes a conventional looking-glass. The looking-glass effect is adapted to intensify the light from the lamp 12 and so enhance the value of the lamp shade. If desired the outer face of the mirroring 15 may be decorated, which decoration will not effect the looking-glass effect. While the shade 13 has been illustrated upon the drawing as comprising five flat sides, this is merely a matter of design and any number may be used, as for example six.

Figure 1:
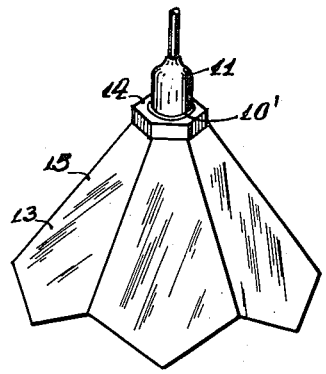
Fig. 1 is a perspective view of a mirror lamp shade constructed according to this invention.
Figure 3:
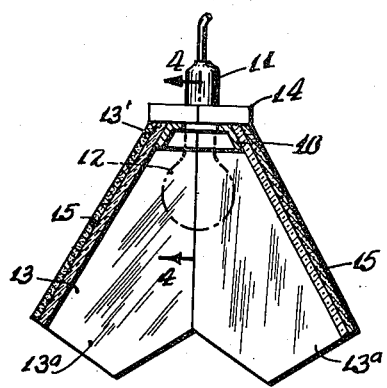
Fig. 3 is a sectional view taken on the line 3—3 of Fig. 2.
Figure 2:
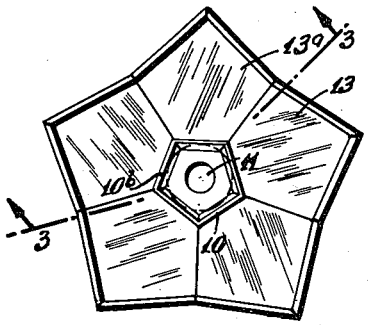
Fig. 2 is a bottom elevational view of Fig. 1.
Figure 5:
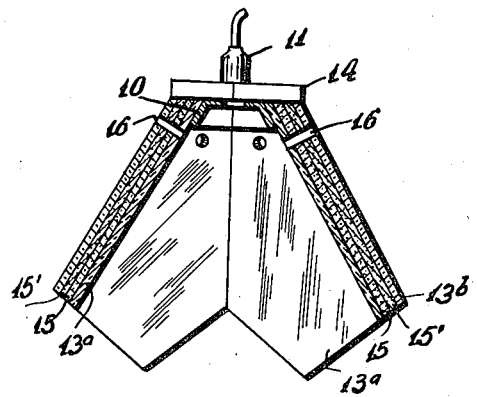
Fig. 5 is a view similar to Fig. 3 but illustrating another embodiment of the invention.

In Fig. 5 another embodiment of the invention has been disclosed in which the device is provided with a lamp shade 13$^b$ distinguished from the lamp shade 13 merely in the fact that it is formed with mirroring 15' arranged upon the inner side. With this arrangement the outer side of the lamp shade will reflect objects and constitute a looking-glass in addition to the mirroring 15 for the innerside 13a. Still further the sides of the shade 13b is formed with a plurality of openings 16 for the passage of light from the interior of the shade to the exterior. With this arrangement certain rays of light from the lamp 12 will filter through and reach the outside of the shade and illuminate the looking-glass. In other respects this form of the invention is identical to the previous form and similar parts may be recognized by the same reference numerals.

Figure 7:
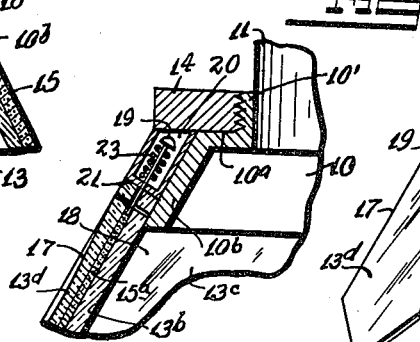
Fig. 7 is a fragmentary enlarged sectional view taken on the line 7—7 of Fig. 6.
Figure 6:
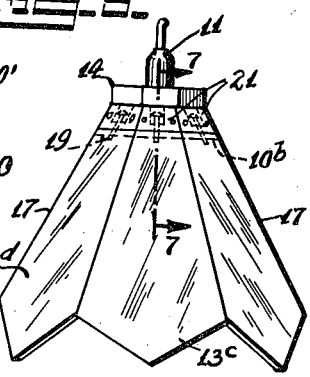
Fig. 6 is a side elevational view of a mirroring lamp shade according to a further embodiment of the invention.

In Figs. 6 and 7 another embodiment of the invention has been disclosed which is characterized by the provision of a shade 13c distinguishing from the shade 13 in construction whereby both sides are in the form of mirrors. More particularly the shade 13c is formed from double glass material, with mirroring on the inner adjacent sides. The arrangement is identical as though two mirrors were placed back against back. The outer material 13d is formed with a curved face 17 so as to vary the size of the reflected image. If the surface 17 is convexed there will be one effect and if concaved there will be another effect. The inner material 13b has a flat inner face 18 so as to be similar to a conventional flat mirror. Reference numeral 15a represents the mirroring between the layers 13b and 13d.

Still further, the form of the invention illustrated in Figs. 6 and 7 is provided with an arrangement whereby the shade 13c is composed of a plurality of flat sides which are separate from each other and are adapted to be reversed so that either of the sides may be outside or inside of the shade. More particularly each of the flat sides of the shade 13c has a pintle pin 19 attached upon its top edge at the center thereof and projecting into a cavity 20 in a flat sided ring 21 which is held upon the sides 10b by the nut 14. The ring 21 has its top edge flush with the shoulder 10a and has its bottom edge slightly spaced above the bottom edges of the sides 10b. Springs 23 are arranged coaxially upon the pins 20 and act between the bases of the cavities 20 and the heads of the pins for normally resiliently holding the sides of the shade upwards so that the top edges are in intimate contact with the bottom edge of the ring 21. In this position the upper portions of the sides of the lamp shade will be in intimate contact with the lower portions of the outer faces of the sides 10b. This arrangement will prevent the sides of the lamp shade from turning.

In other respects the construction of the lamp shade is identical to the form previously described and corresponding parts may be recognized by the same reference numerals. Any one of the sides of the lamp shade may be manually drawn downwards so as to disengage its edges from the edges of the adjacent sides of the lamp shade and simultaneously to disengage the top thereof from intimate contact with the flat sides 10b, and then this drawn side may be rotated through 180° for changing the inner side to the outer side. When released the spring 23 will return it into its raised position in which position it will be held against turning. One, several, or all of the sides may be turned when desired.

It is to be understood that the shape and proportions of the shade members may be varied as desired and suitable ornamentations may also be provided along the surface or edges of the lamp shade.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A mirror lamp shade, comprising a support bracket having a threaded cylindrical shell top portion for receiving a lamp socket and provided with a horizontal intermediate exterior shoulder continuing into a plurality of diverging flat sides of substantially hollow frusto-pyramid form, a diverging shade with the small end at the top and having flat sides connected with each other and the top portions thereof fitting over and over and against said flat sides of the support bracket, and a nut threadedly engaging said top portion and acting against said shoulder and against the top edges of the sides of the shade for holding the shade in fixed position.

2. A mirror lamp shade, comprising a support bracket having a threaded cylindrical shell top portion for receiving a lamp socket and provided with a horizontal intermediate exterior shoulder continuing into a plurality of diverging flat sides of substantially hollow frusto-pyramid form, a diverging shade with the small end at the top and having flat sides connected with each other and the top portions thereof fitting over and over and against said flat sides of the support bracket, and a nut threadedly engaging said top portion and acting against said shoulder and against the top edges of the sides of the shade for holding the shade in fixed position, said shade being formed from glass or similar material, silvered on one side so that the other side is a looking glass.

3. A mirror lamp shade, comprising a support bracket having a threaded cylindrical shell top portion for receiving a lamp socket and provided with a horizontal intermediate exterior shoulder continuing into a plurality of diverging flat sides of substantially hollow frusto-pyramid form, a diverging shade with the small end at the top and having flat sides connected with each other and the top portions thereof fitting over and over and against said flat sides of the support bracket, and a nut threadedly engaging said top portion and acting against said shoulder and against the top edges of the sides of the shade for holding the shade in fixed position, said shade being formed from glass or similar material, silvered on one side so that the other side is a looking glass, said shade being silvered on the outside.

4. A mirror lamp shade, comprising a support bracket having a threaded cylindrical shell top portion for receiving a lamp socket and provided with a horizontal intermediate exterior shoulder continuing into a plurality of diverging flat sides of substantally hollow frusto-pyramid form, a diverging shade with the small end at the top and having flat sides conected with each other and the top portions thereof fitting over and over and against said flat sides of the support bracket, and a nut threadedly engaging said top portion and acting against said shoulder and against the top edges of the sides of the shade for holding the shade in fixed position, said shade being formed from glass or similar material mirrored on one side so that the other side is a looking glass, said shade being mirrored on the inside.

5. A mirror lamp shade, comprising a support bracket having a threaded cylindrical shell top portion for receiving a lamp socket and provided with a horizontal intermediate exterior shoulder continuing into a plurality of diverging flat sides of substantially hollow frusto-pyramid form, a diverging shade with the small end at the top and having flat sides connected with each other and the top portions thereof fitting over and over and against said flat sides of the support bracket, and a nut threadedly engaging said top portion and acting against said shoulder and against the top edges of the sides of the shade for holding the shade in fixed position, said shade being formed from glass or similar material, silvered on one side so that the other side is a looking glass, said shade being provided with several openings through the side thereof for the passage of some of the rays of light through the lamp mounted in said socket from the interior to the exterior.

6. A mirror lamp, comprising a support bracket having a plurality of diverging flat sides substantially of hollow frusto-pyramid form, a diverging shape with the small end at the top and having flat sides with the edges free from each other and in intimate contact with each other and with the top portions thereof fitting over and against the lower portions of said flat sides, a ring with flat sides upon said flat sides arranged with the lower edges thereof in intimate contact with the upper edges of said flat sides, and cooperative means between said ring and said sides for adjustably holding the sides so that they may be adjusted with either of their faces to the outside.

7. A mirror lamp, comprising a support bracket having a plurality of diverging flat sides substantially of hollow frusto-pyramid form, a diverging shade with the small end at the top and having flat sides with the edges free from each other and in intimate contact with each other and with the top portions thereof fitting over and against the lower portions of said flat sides, a ring with flat sides upon said flat sides arranged with the lower edges thereof in intimate contact with the upper edges of said flat sides, and cooperative means between said ring and said sides for adjustably holding the sides so that they may be adjusted with either of their faces to the outside, said cooperative means comprising a pin projecting from the top edge at the center of each of the sides into cavities in said ring, resilient means urging said pins upwards to cause the engagement of the top edge of the sides with the bottom edge of said ring, and said sides being manually extendable downwards to disengage the top portions thereof from said flat sides of the bracket so as to be manually turnable.

BOLESLAW MATEUSZCZYK.